United States Patent [19]

Earp

[11] 4,053,892
[45] Oct. 11, 1977

[54] SYSTEM FOR ENABLING COHERENT SIGNAL PROCESSING AT A REMOTE RECEIVING STATION

[75] Inventor: Charles W. Earp, London, England

[73] Assignee: International Standard Electric Corporation, New York, N.Y.

[21] Appl. No.: 662,342

[22] Filed: Mar. 1, 1976

[30] Foreign Application Priority Data
Mar. 6, 1975  United Kingdom ................ 9355/75

[51] Int. Cl.² .............................................. G01S 1/44
[52] U.S. Cl. .......................... 343/106 R; 343/100 SA
[58] Field of Search ........ 343/100 SA, 108 M, 106 R, 343/16 R

[56] References Cited

U.S. PATENT DOCUMENTS

| | | | |
|---|---|---|---|
| 3,107,352 | 10/1963 | Shapcott | 343/106 R |
| 3,787,859 | 1/1974 | Howard | 343/106 R |
| 3,873,983 | 3/1975 | Sothcott et al. | 343/106 D |

Primary Examiner—T.H. Tubbesing
Assistant Examiner—T. M. Blum
Attorney, Agent, or Firm—William T. O'Neil

[57] ABSTRACT

A system involving a mechanically or electronically scanned beam of electromagnetic energy and separate antenna means for transmitting a phase reference signal. A remote receiving station, such as on-board an aircraft on landing approach, is able to process received signals coherently to take advantage of the increased accuracy available in such processing.

8 Claims, 2 Drawing Figures

SYSTEM FOR ENABLING COHERENT SIGNAL PROCESSING AT A REMOTE RECEIVING STATION

BACKGROUND OF THE INVENTION

1. Field of the Invention

The invention relates generally to electronic aids to air navigation, and more particularly, to the so-called scanning-beam microwave landing system.

2. Description of the Prior Art

The known conventional time-reference scanning-beam microwave landing system includes transmitting apparatus and a mechanically or electrically scanned antenna arranged to scan a single frequency,, collimated beam throughout an angular sector of interest. The time of reception of the beam with respect to a reference pulse gives angular information, and the detected signal at the remote receiving station (such as for example, in the aircraft on landing approach) of the system is related directly to the received power radiating from the scanning beam antenna and as such, it is incoherent or non-coherent in nature. The use of coherent signal processing techniques, which may be required or highly desirable to achieve the required accuracies in difficult situations, for example, in respect to low angle coverage in the elevation plane, is not possible. Coherent detection is usually associated with "two-way" radar systems, and in such devices it is possible to use means to "remember" (store) the transmitted phase while waiting for an echo signal which may then be processed against the remembered (stored) transmitted phase. One way of "remembering" the transmitted phase in such 2 way arrangements is to heterodyne-down the microwave transmitted signal and use it to lock-in a coherent oscillator (coho) usually in the IF domain. Received echo signals are then reduced to the IF domain and are coherently (phase) detected.

The text Radar Handbook by Merrill I. Skolnik (McGraw Hill 1970), particularly Chapter 17 thereof, provides a background in connection with coherent detection, FIG. 3 of that chapter outlining the concepts in a straightforward prior art radar system.

Since the so-called scanning-beam landing system is a "one-way" system for providing air-derived angle data using the ground scanning transmission as a beacon, the usual technique of simply "remembering" the transmitted phase, while waiting for a processable echo signal, is not available.

The transmitted beam mechanical scanning techniques and also the electronic (inertialess) scanning techniques (such as in connection with phased-array scanning) are prior art, per se, as they may be incorporated in the combination of the present invention. The aforementioned Radar Handbook test is also a useful reference in connection with the various known forms of beam scanning, as may be employed herewith.

The manner in which the present invention provides the capability for coherent airborne signal processing will be understood as this description proceeds.

SUMMARY OF THE INVENTION

According to the invention, a transmitter and scanning antenna arrangement provides for the scanning of a predetermined angular (service) sector of space with a single-frequency collimated radio beam. Separate means including a separate antenna for illuminating at least the aforementioned service sector with a reference signal of frequency offset from the scanning beam frequency, is also provided. From the received signals the remote receiving station, i.e., the aircraft on landing approach, can detect both frequencies and using the reference transmission as a phase reference, can coherently process the scanning beam received signal.

According to the invention, the reference signal may be transmitted from a separate radiator, so-sited with the mechanically or electronically scan antenna, or if a phase-array antenna is being used to produce the scanning beam, an element therefrom may be reserved for the transmission of the reference signal.

DESCRIPTION OF THE PREFERRED EMBODIMENT

Figure 1:
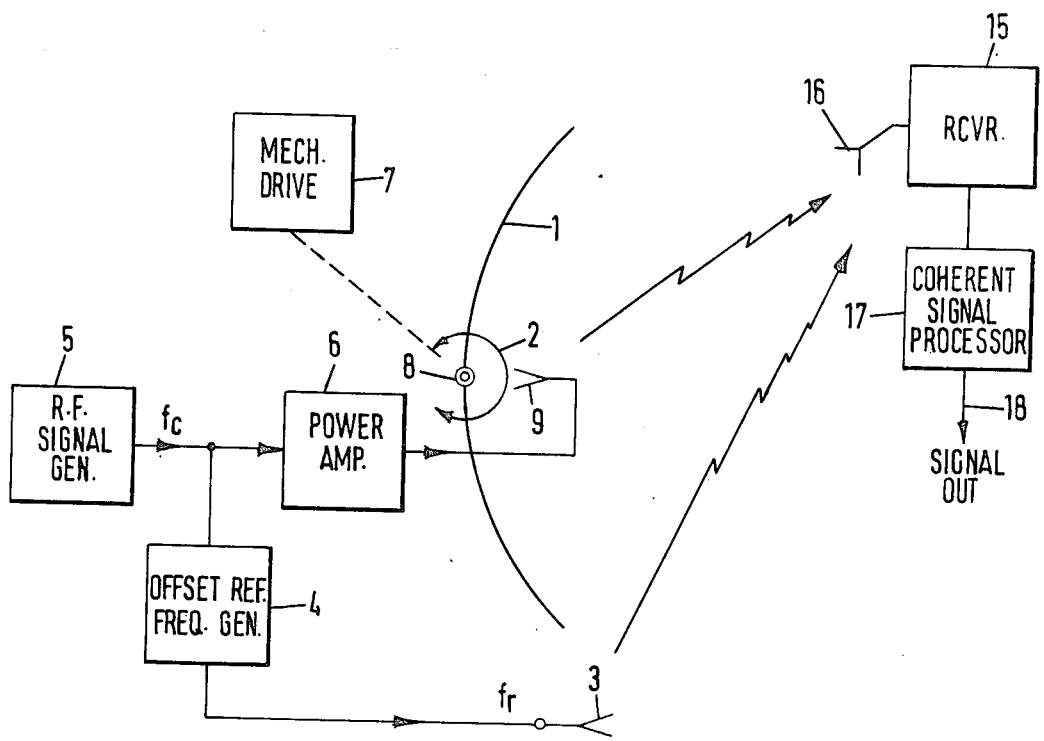
FIG. 1 depicts the combination of the present invention in connection with a mechanically scanned antenna arrangement, and also shows a remote receiving station (airborne) in block diagram form.

Referring now to FIG. 1, a typical mechanically scanned dish-antenna and feed are shown at 1 and 9, respectively. A sector scanning effect is produced by physically oscillating the dish 1 about the point 8, as depicted by the rotational arrow 2, it being understood that the mechanical drive 7 provides this motion in the well known manner. An RF signal generator 5 generates the signal $f_c$ which is power amplified in 6 and applied through the feed 9 to illuminate the dish 1, thereby transmitting the collimated beam aforementioned. The signal $f_c$ is also applied to an offset reference frequency generator 4 which offsets $f_c$ by $f_o$ to produce the reference frequency $f_r$. The device 4 may be, for example, a beat-type device which mixes $f_c$ with a fixed stable source of $f_o$, thereby obtaining $f_c \pm f_o$, one of these sum and difference frequencies being readily discarded by filtering and the other being passed on to illuminate the reference radiator 3, as illustrated.

It will be understood that the use of power amplification at 6 is shown by way of example only. Whether or not such an expedient is required will depend on the signal level generated in 5. In any event, the device 4 may be expected to operate satisfactorily at a relatively high or relatively low power level depending on the details of design and it is to be understood that power amplification between 4 and the reference radiator 3 may be applied as an ordinary engineering matter. The remote receiving station (airborne) comprises the receiving antenna 16 which accepts both the reference from radiator 3 and the swept-collimated beam from 9 and 1. The receiver 15 is shown symbolically, it being understood that it is of a type which will beat the two received signals $f_c$ and $f_r$ to produce a video signal of average frequency $f_o$, time-modulated by the scanning beam shape. The instantaneous phase of the beat signal at any point in time depends on the phase relationship between reference and beam, thus providing a coherently detected beam signal. The coherent signal processor 17 may be an MTI canceller of the known prior art, or may be some other form of video signal processing to provide an output at 18. The exact form of coherent signal processing is not a part of the present invention, per se, it being recognized by those skilled in this art that this additional processing may be accomplished in accordance with the particular objective to be accomplished.

One important characteristic of the above-described coherence is that it provides a means in the receiver of separating the contributions of difference parts of the transmitting antenna's aperture, since on a frequency basis, the spectrum of the beat envelope [$(f_o - 1/\tau)$ to $(f_o + 1/\tau$, where $\tau$ is the beam dwell time] is composed of variously Doppler-shifted contributions corresponding to different regions of the aperture.

These separated contributions all contain phase and amplitude information, and allow unrestricted receiver (airborne station) tapering of the antenna aperture.

Figure 2:
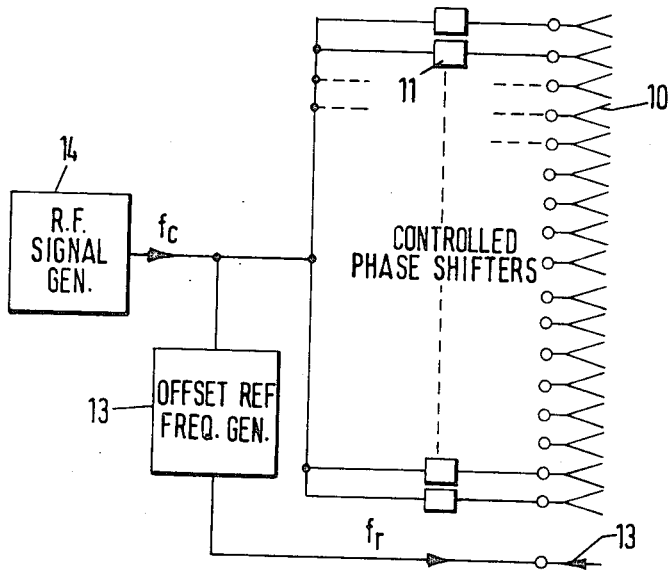
FIG. 2 depicts an alternative scanning antenna in the form of a phased array for the same purpose as FIG. 1, it being understood that the airborne receiving station of FIG. 1 would be employed in connection therewith.

Referring now to FIG. 2, a phased array of elements, typically 10, with associated, controlled, phase shifters in 11, provides an alternative means for transmitting the aforementioned collimated beam at the frequency $f_c$. A separate reference antenna 12 for transmitting the frequency $f_r$ offset in the same way and by the same process typically, as in connection with FIG. 1, by the offset reference generator 13, produces the identical frequency relationships described in connection with FIG. 1. In this case, the power amplification of the output of the RF signal generator feeding the phase shifters of the phased array, has been omitted, however, it is to be understood that the same considerations apply in respect to power amplification and signal levels as were discussed in connection with FIG. 1.

From an understanding of the foregoing, those skilled in this art may make modifications or variations falling within the spirit of the invention and accordingly, it is not intended that the drawings or this specification should be regarded as limiting the scope of the invention. The drawings and this description are to be regarded as typical and illustrative only.

What is claimed is:

1. In a microwave landing system of the scanning beam type in which a remote receiving station derives angular navigational information from the transmissions of a ground beacon by processing signals received from said beacon, the combination of comprising:
    a scanning antenna within said ground beacon, all the radiating elements of which are contemporaneously excited for sweeping a collimated beam through a predetermined angular sector of space;
    first means for generating a first radio frequency signal to energize said scanning antenna;
    second means responsive to said first radio frequency signal for generating a second ratio frequency signal therefrom, said second means being responsive to said first ratio frequency signal for generating said second ratio frequency with a predetermined phase relationship with said first radio frequency signal but offset therefrom in frequency, said second ratio frequency signal being substantially continuous during transmission of said first radio frequency signal, and substantially independent of the transmissions and angular position of said scanning antenna;
    and a nonscanning second antenna arranged to provide radiation coverage at least over said sector swept by said scanning antenna, said second antenna being energized by said second radio frequency signal, said second radio frequency signal thereby providing a reference signal at said remote receiving station for coherent processing of said first radio frequency signal received at said remote station.

2. A system according to claim 1 in which said scanning antenna comprises a mechanically scanned reflector and feed arrangement.

3. A system according to claim 1 in which said scanning antenna comprises an electronically scanned array for providing inertialess scanning by a technique selected from a group including frequency scanning and controlled-phase feed to provide a scanning array.

4. A system according to claim 3 in which said scanning antenna comprises a phased array scanner.

5. Apparatus according to claim 2 in which said second antenna is defined as being sited at a fixed position adjacent to said scanning antenna.

6. Apparatus according to claim 3 in which said second antenna is defined as being sited at a fixed position adjacent to said scanning antenna.

7. Apparatus according to claim 3 in which said array comprises a plurality of radiating elements, at least one of which is electrically spearate from said radio frequency signal energization and is energized by said second ratio frequency signal.

8. Apparatus according to claim 4 in which said array comprises a plurality of radiating elements, at least one of which is electrically separate from said first radio frequency signal energization and is energized by said second radio frequency signal.

* * * * *

UNITED STATES PATENT AND TRADEMARK OFFICE
CERTIFICATE OF CORRECTION

PATENT NO. : 4,053,892
DATED : October 11, 1977
INVENTOR(S) : Charles W. Earp

It is certified that error appears in the above-identified patent and that said Letters Patent are hereby corrected as shown below:

Claim 1, column 4, lines 2, 4, 5 and 8, change "ratio" to -- radio --.

Signed and Sealed this

Twenty-fourth Day of January 1978

[SEAL]

Attest:

RUTH C. MASON
Attesting Officer

LUTRELLE F. PARKER
Acting Commissioner of Patents and Trademarks